Dec. 6, 1966 W. HORBERG 3,289,907

TAPE DRIVE ASSEMBLY

Filed Sept. 11, 1964

INVENTOR.
William Horberg
BY
Johnson and Kline
ATTORNEYS

United States Patent Office 3,289,907
Patented Dec. 6, 1966

3,289,907

TAPE DRIVE ASSEMBLY

William Horberg, Trumbull, Conn., assignor to Horberg Grinding Industries, Inc., Bridgeport, Conn., a corporation of Connecticut Filed Sept. 11, 1964, Ser. No. 395,774
7 Claims. (Cl. 226—181)

This invention relates to a tape drive assembly of the type including a rotatable driving capstan and a pinch-roller for pressing a tape into driving engagement with a surface thereof. More specifically it pertains to an adjustable mount for the pinch-roller of such an assembly, which enables adjustments to be made in the relationship between the tape engaging surfaces of the capstan and pinch-roller and between the respective planes of rotation thereof.

Heretofore, it has been common practice to provide tape drive assemblies with means for assuring that the desired parallel relationship is obtained and maintained between the tape engaging surfaces of the capstan and pinch-roller, whereby the optimum pressure is evenly applied at both sides of the tape passing therebetween. While the aforesaid adjustment means have assured the proper relationship between the tape engaging surfaces of the capstan and pinch-roller, it has been found that further adjustment must be made in the relationship of these two basic elements of the assembly to achieve the desired tape drive. It is necessary, in order to assure the continued travel of the tape in a predetermined path, that the planes of rotation of the capstan and pinch-roller be parallel, since even the slightest deviation from this relationship will eventually cause the tape to skew or ride out of its normal path relative to the capstan.

Prior attempts to eliminate tape skewing have primarily resided in efforts to initially mount the capstan and pinch-roller in a predetermined desired relationship, but such efforts have not completely solved the problem since they fail to provide means for adjusting the relationship to compensate for misalignment resulting from wear, vibration or the like. In those instances where adjustment means have been provided, the mechanisms relied upon have been complicated, expensive and not completely effectual.

It is an important object of the present invention, therefore, to overcome the problems existing in tape drive assemblies by providing simple, accurate means for adjusting the relationship between the tape engaging surfaces of the capstan and pinch-roller and between the respective planes of rotation thereof.

It is also an object of the invention to provide a tape drive assembly wherein the pinch-roller is rotatably mounted adjacent the capstan in such a manner that its rotatable axis may be adjustably shifted in and/or transverse to the plane of the rotatable axis of the capstan for controlling the relationship between the tape engaging surfaces thereof and between their respective planes of rotation.

Another object of the invention is to provide a tape drive assembly wherein the pinch-roller is rotatably mounted in a predetermined manner relative to the capstan by means which are adjustably shiftable in a plurality of directions relative to the capstan for moving the pinch-roller into optimum driving relation therewith.

Still another object of the invention is to provide a tape drive assembly wherein the pinch-roller is mounted relative to the capstan by means which are both adjustably pivotal toward and away from the capstan in the plane of its rotatable axis, for tilting the rotatable axis of the pinch-roller to move its tape engaging surface into parallel relation with the tape engaging surface of the capstan, and rotatable in a plane transverse to the plane of the rotatable axis of the capstan, for tilting the rotatable axis of the pinch-roller to move its plane of rotation into parallel relation with the plane of rotation of the capstan.

It is further an object of the invention to provide a tape drive assembly which is of simple construction, readily adjusted to assure uniform even application of pressure to opposite sides of the tape and elimination of tape skewing, and is of such rugged character it will function over a long period of time with freedom from all difficulties.

Other objects and advantages of the invention will be apparent from the specification and claims, when considered in connection with the attached sheet of drawings, illustrating one form of the invention, wherein like characters represent like parts and in which:

Figures 1, 4, 5:
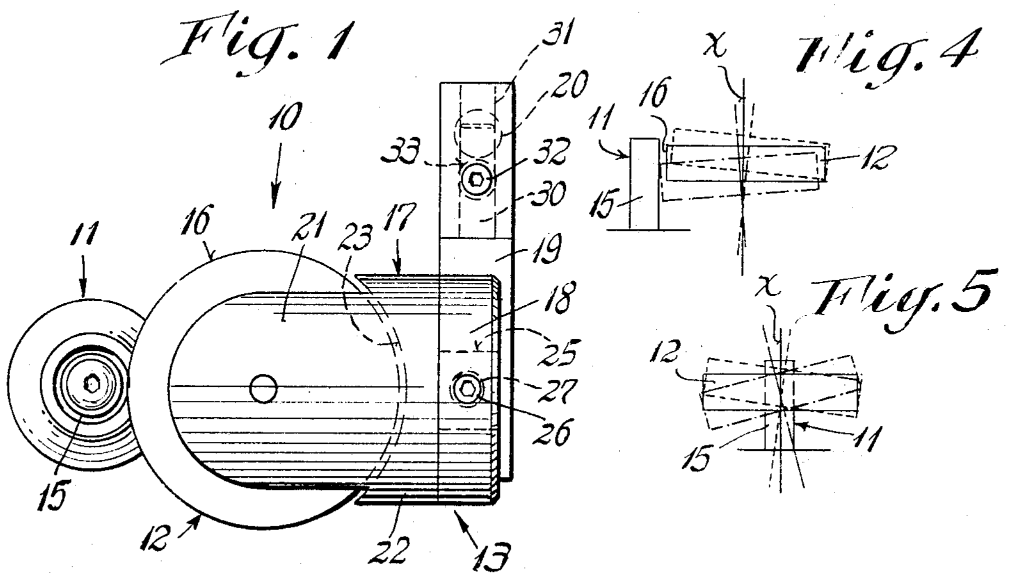
FIGURE 1 is a plan view of a tape drive assembly embodying the invention.
FIG. 4 is a diagrammatic view of one pinch-roller adjustment according to the invention.
FIG. 5 is a diagrammatic view of a second pinch-roller adjustment according to the invention.
Figure 2:
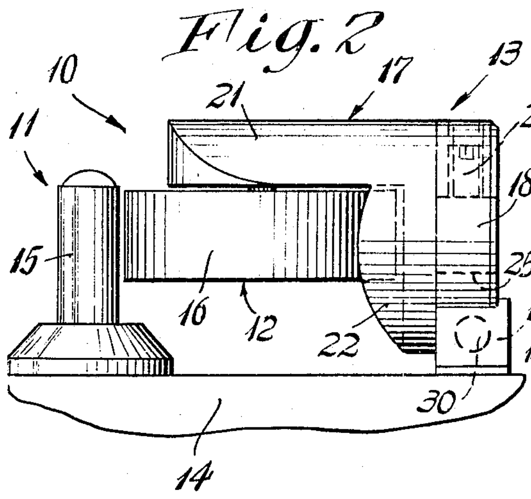
FIG. 2 is a side elevational view of the tape drive assembly of FIG. 1.
Figure 3:
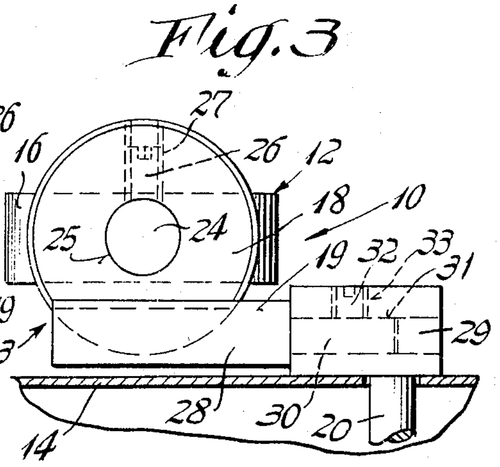
FIG. 3 is a rear elevational view of the tape drive assembly of FIG. 1.

Referring now to the drawings for a more detailed description of the invention, in FIGS. 1 to 3 a tape drive assembly 10 is shown including a rotatable capstan 11, a pinch-roller 12 and means 13 for mounting the pinch-roller in a predetermined manner relative to the capstan.

While the tape drive assembly herein discussed may form part of any conventional tape transporting device and may be mounted thereon in any known manner, it is herein shown as being mounted on the tape deck 14 of a tape recorder or the like.

The capstan 11, which is the driving element of the tape drive assembly and is driven by a motor or similar means (not shown) at a predetermined speed, is rotatably mounted on the tape deck 14 to project outwardly thereof and provide a cylindrical surface 15 for carrying the tape. As is conventional, the axis of rotation of the capstan is predeterminately fixed relative to the tape deck and requires no adjustment.

The pinch-roller 12, which is normally formed of hard rubber or similar material and has a cylindrical tape engaging surface 16 for pressing the tape into driving engagement with the surface 15 of the capstan, is freely rotatably mounted above the tape deck 14, adjacent the capstan, by the mounting means 13.

The pinch-roller mounting means 13, which is preferably movable toward and away from the capstan to engage and disengage the pinch-roller therewith, whereby tape threading or removal is facilitated, is here shown to include a pinch-roller mounting block 17, block support 18 and base 19, the latter being pivotally mounted in the tape deck, as illustrated at 20 (see FIG. 3), for the desired movement toward and away from the capstan by conventional means (not shown).

In tape drive assemblies, of the type including capstan and pinch-roller, it is essential that a predetermined parallel relationship be established and maintained between the respective tape engaging surfaces and between the planes of rotation of the capstan and pinch-roller, since deviations from these relationships may result in irregular tape drive and skewing of the tape. While substantially all tape drive assemblies heretofore known are adjustable to assure that the desired parallel relationship exists between the tape engaging surfaces of the capstan and pinch-roller, the instant assembly is additionally adjustable to secure and maintain the desired parallel relationship between the planes of rotation thereof.

Referring to FIGS. 4 and 5, it will be seen that the desired adjustments, according to this invention, are achieved by shifting the axis of rotation *x* of the pinch-roller relative to the capstan. In FIG. 4, adjustment of the pinch-roller to move its tape engaging surface 16, or the plane of such surface at the point of tape contact, into parallel relationship with the tape engaging surface of the capstan is shown, in dotted lines, as being achieved by shifting or tilting the rotational axis *x* of the pinch-roller toward or away from the capstan in the plane of the capstan's rotational axis. In FIG. 5 the planes of rotation of the capstan and pinch-roller are brought into parallel relation by again shifting or tilting the rotational axis *x* of the pinch-roller, but this time, as shown, in a direction transverse to the plane of the rotational axis of the capstan.

Referring again to FIGS. 1 to 3, it will be seen that the adjustment of the relationship between the pinch-roller and the capstan, as diagrammatically illustrated in FIGS. 4 and 5, is accomplished through the pinch-roller mounting means 13. The pinch-roller is rotatably carried in any known manner by a mounting means hood 21, forming an integral part of the mounting block 17, the body 22 of the latter being internally concave as shown at 23 to accommodate the pinch-roller. The mounting block 17 is rotatably connected to the block support 18 through a stud 24 received in an opening 25 formed in the support. A set screw or the like 26 threaded into a bore 27 in the support 18 locks the stud 24 against rotation in the opening 25 when the mounting block is adjusted by rotation to move the pinch-roller into position so that its plane of rotation is parallel to the plane of rotation of the capstan.

The base 19, which is connected to the tape deck 14 through the pivot 20, includes pivotally connected first and second portions 28 and 29, respectively, the former mounting block support 18, which is secured thereto in any known manner. The portion 28 of the base is formed with an integral stud 30 which is rotatably received in an opening 31 formed in the second base portion 29. A set screw 32 is threaded into a recess 33 in the portion 29 for locking the stud 30 against rotation in the opening 31 when the mounting means has been pivoted to a desired position for tilting the axis of the pinch-roller in the plane of the rotational axis of the capstan, whereby the tape engaging surfaces of the pinch-roller and the capstan are brought into parallel relationship.

By means of the structure above-described, it will be readily appreciated that by controlled adjustment of the pinch-roller mounting means 13 pivotally in the plane of the rotational axis of the capstan and rotatably in a plane transverse to the plane of the rotational axis of the capstan the desired relationship between the capstan and pinch-roller may be obtained.

Thus, among others, the several objects and advantages of the invention as aforenoted are achieved. Obviously numerous changes in the structure may be resorted to without departing from the spirt of the invention as defined by the claims.

I claim:

1. A tape drive assembly comprising a rotatable capstan having a surface for carrying said tape, a pinch-roller for pressing said tape into engagement with said surface of said capstan and means for rotatably mounting said pinch-roller in a predetermined manner relative to said capstan, said mounting means including adjustable block means for tilting the axis of rotation of said pinch-roller relative of the axis of rotation of said capstan in at least two transverse directions, whereby the relationship between the tape engaging surfaces and the planes of rotation respectively of said capstan and pinch-roller may be adjusted.

2. A tape drive assembly comprising a rotatable capstan having a surface for carrying said tape, a pinch-roller for pressing said tape into engagement with said surface of said capstan and means for rotatably mounting said pinch-roller in a predetermined manner relative to said capstan, said mounting means including adjustable block means for tilting the rotatable axis of said pinch-roller through an arc in a direction toward and away from the rotatable axis of said capstan for adjusting the parallel relationship of the tape engaging surfaces of said pinch-roller and capstan, and means for tilting the rotatable axis of said pinch-roller thorugh an arc normal to said first direction of tilting for adjusting the parallel relationship of the planes of rotation of said pinch-roller and capstan.

3. A tape drive assembly comprising a rotatable capstan having a surface for carrying said tape, a pinch-roller for pressing said tape into engagement with said surface of said capstan and means for rotatably mounting said pinch-roller in a predetermined manner relative to said capstan, said mounting means including a mounting block rotatably carrying said pinch-roller, means for moving said mounting block through an arc for tilting the rotatable axis of said pinch-roller toward and away from the rotatable axis of said capstan for adjusting the parallel relationship of the tape engaging surfaces of said pinch-roller and said capstan, and means for rotating said mounting block for tilting the rotatable axis of said pinch-roller through an arc in a direction normal to said first direction of tilting for adjusting the parallel relationship of the planes of rotation of said pinch-roller and said capstan.

4. A tape drive assembly comprising a rotatable driven capstan having a surface for carrying said tape, a pinch-roller having a surface for pressing said tape into engagement with said surface of said capstan and means for rotatably mounting said pinch-roller in a predetermined manner relative to said capstan, said mounting means including a mounting block rotatably carrying said pinch-roller, means pivotally mounting said mounting block for movement relative to said capstan in an arc for tilting the rotatable axis of said pinch-roller in a direction toward and away from the rotatable axis of said capstan so that the tape engaging surface of said pinch-roller is moved into parallel relationship with the tape engaging surface of said capstan, and means for rotatably mounting the mounting block for rotation in a direction normal to said arc for tilting the rotatable axis of said pinch-roller in a direction normal to said first direction of tilting for moving the plane of rotation of said pinch-roller into parallel relationship with the plane of rotation of said capstan.

5. A tape drive assembly comprising a rotatable driven capstan having a surface for carrying said tape, a pinch-roller having a surface for pressing said tape into engagement with said surface of said capstan and means for rotatably mounting said pinch-roller in a predetermined manner relative to said capstan, said mounting means including a mounting block having said pinch-roller rotatably depending therefrom, means mounting said mounting block in a predetermined position relative to said capstan and having first means for pivoting said mounting block in a direction toward and away from said capstan for tilting the rotatable axis of said pinch-roller toward and away therefrom so that the tape engaging surface of said pinch-roller may be adjusted into parallel relationship with the tape engaging surface of said capstan, and second means for rotating said mounting block in a direction normal to said direction of pivoting for tilting the axis of relation of said pinch-roller in such direction of rotation so that the plane of rotation of said pinch-roller may be adjusted into parallel relationship with the plane of rotation of said capstan.

6. A tape drive assembly comprising a rotatable driven capstan having a surface for carrying said tape, a pinch-roller having a surface for pressing said tape into engagement with said surface of said capstan and means for rotatably mounting said pinch-roller in a predetermined manner relative to said capstan, said mounting means including a mounting block rotatably supporting said pinch-roller in depending position adjacent said capstan, said mounting block being adjustably rotatably carried by a support for predetermined positioning so that the rotatable axis of said pinch-roller is tiltable to assure that the planes of rotation of said capstan and pinch-roller are aligned in parallel relation, said support being adjustably pivotal in a direction toward and away from said capstan for tilting the rotatable axis of said pinch-roller in such direction so that the tape engaging surfaces of said pinch-roller and capstan are adjustably aligned in parallel.

7. In a tape drive assembly including a rotatable driven capstan having a surface for carrying said tape, a pinch-roller having a surface for pressing said tape into engagement with said surface of said capstan, and means for rotatably mounting said pinch-roller in a predetermined manner relative to said capstan; the improvement wherein said mounting means comprises adjustable block means for tilting the axis of rotation of said pinch-roller toward and away from the axis of rotation of said capstan for aligning the tape engaging surfaces of said pinch-roller and capstan in parallel relationship, and means for tilting the axis of rotation of said pinch-roller in a direction transverse to the first direction of tilting for aligning the planes of rotation of said pinch-roller and capstan in parallel relationship.

References Cited by the Examiner

UNITED STATES PATENTS

| | | | |
|---|---|---|---|
| 2,721,650 | 10/1955 | Cummings et al. | 226—180 X |
| 2,998,906 | 9/1961 | Vice et al. | 226—191 X |
| 3,035,748 | 5/1962 | Van Vechten | 226—190 X |
| 3,136,467 | 6/1964 | Olson et al. | 226—177 |

M. HENSON WOOD, JR., *Primary Examiner.*

C. H. SPADERNA, R. A. SCHACHER, *Assistant Examiners.*